UNITED STATES PATENT OFFICE.

ADOLPH FRANK, OF CHARLOTTENBURG, PRUSSIA, GERMANY.

PRODUCTION OF SULPHITE SOLUTIONS.

SPECIFICATION forming part of Letters Patent No. 376,189, dated January 10, 1888.

Application filed October 18, 1886. Serial No. 216,560. (No specimens.) Patented in Germany March 23, 1886, No. 40,308; in England October 18, 1886, No. 13,286; in Canada December 24, 1886, No. 25,613, and in Austria-Hungary April 1, 1887, No. 40,472 and No. 5,831.

*To all whom it may concern:*

Be it known that I, ADOLPH FRANK, doctor of philosophy, a subject of the Emperor of Germany, residing at Charlottenburg, Prussia, German Empire, have invented certain new and useful Improvements in the Production of Sulphite Solutions, (for which I have obtained Letters Patent in Austria-Hungary No. 40,472 and No. 5,831, dated April 1, 1887; in Canada, No. 25,613, dated December 24, 1886; in Germany, No. 40,308, dated March 23, 1886; and in Great Britain, No. 13,286, dated October 18, 1886;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has relation to the treatment of the lyes resulting from the manufacture of cellulose, paper, &c., by the so-called "sulphite" process, the invention having for its object the recovery of the sulphurous acid and the utilization of the organic matter, either as food for cattle or as a fertilizer.

To these ends the invention consists in a certain novel process of treatment, substantially as hereinafter fully described, and as set forth in the claims.

The residuary lyes above referred to contain besides sulphurous acid also sulphurous acid in the form of sulphites and in the form of acid sulphites, the latter combined with a metal—as calcium or magnesium, or potassium or sodium, according to the acid-sulphite solution employed in the sulphite process. The recovery of the sulphurous acid by the boiling process is incomplete, as I have found that the acid sulphites are so combined with organic matter that the latter is but slowly decomposed by boiling, even in the presence of an acid. Besides this, the calcium monosulphite precipitate obtained is so slimy and contaminated with organic matter as to render its recovery and further use almost impossible. If the lyes contain a certain amount of sulphurous acid and its combinations, they cannot be emptied into small running streams, for the reason that the water of the latter is injuriously contaminated by the absorption of oxygen and the formation of sulphuric acid, while the recovery or further use of the organic components of the lye is rendered more difficult, in fact impossible.

The treatment of the residuary lyes referred to varies according to the base of the acid-sulphite solution primarily employed. If the lye has lime for its basis, I add thereto an equivalent of caustic lime or carbonate of lime equal to the equivalent of free sulphuric acid in the lye, deduction being made of the acid combined with the lime base in the form of a monosulphite. On the other hand, if magnesia forms the base of the lye, I treat the latter with a quantity of lime equal to the whole of the sulphurous acid present in the lye. Finally, if the lye contains neutral or acid sulphite of soda or of potash, I treat said lye with a mixture of lime and chloride of calcium in such proportions that the chloride of calcium will be equal to the soda or potash present in the lye, and the lime in the form of caustic or carbonate of lime will be equal to the sulphurous acid present in said lye irrespective of the monosulphite combined with the sodium or potassium.

In either of the above cases nearly all the sulphurous acid is precipitated in the form of an almost insoluble calcium monosulphite under decomposition of the organic combinations of the acid sulphites as well as of the soluble acid sulphites themselves.

The precipitation may be accelerated by the addition of an excess of lime, heating, and agitating.

The volume of the resulting calcium monosulphite may be considerably increased by introducing into the solution containing an excess of lime the vapors and gases escaping from the boilers, which vapors carry with them sulphurous acid, and which latter is converted into calcium monosulphite by the excess of lime in the solution, and is thus made available instead of being lost. The precipitate is then separated from the lye either by decantation or filtration or in a filter-press, and freed from the organic matter by washing in water, to which a neutral salt is added—such as, sodium or calcium chloride—or sulphate of soda may be added, for the purpose of increasing its specific gravity.

Owing to its greater specific gravity the calcium monosulphite may be readily separated from the lighter organic matter, and eventually, also, from any magnesia precipitated therewith, as these two bodies, owing to their low specific gravity, will precipitate or settle more slowly than the heavier calcium monosulphite. The purification of the monosulphite may also be effected by washing in an attenuated solution of sulphurous acid or in a solution of acid sulphite of lime or other acid sulphite of the alkalies or magnesia or alkaline earths, whereby the organic matter is dissolved and the monosulphite obtained in a pure state.

I would observe that the precipitation of the calcium monosulphite from the lyes referred to is more readily accomplished with the caustic lime than with the carbonate of lime.

The monosulphite obtained as described I employ in various ways for the production of acid-sulphite solutions, as more fully described in my application for patent filed July 21, 1887, Serial No. 244,914.

Having now described my invention, what I claim is—

1. The herein-described process of recovering the free as well as the combined sulphurous acid from the lyes resulting from the manufacture of cellulose by the sulphite process, which consists in converting said sulphurous acid into a monosulphite by means of calcium or a calcium salt, as set forth.

2. The herein-described process of recovering the free as well as the combined sulphurous acid from the lyes resulting from the manufacture of cellulose by the sulphite process, which consists in converting said sulphurous acid into a monosulphite by means of calcium or a calcium salt, separating the monosulphite from the lye and purifying the same by washing in a solution of sulphurous acid or of an alkali sulphite or an alkaline earth, as set forth.

In testimony whereof I affix my signature in presence of two witnesses.

ADOLPH FRANK.

Witnesses:
PAUL BOECK,
B. ROI.